Figure 11:
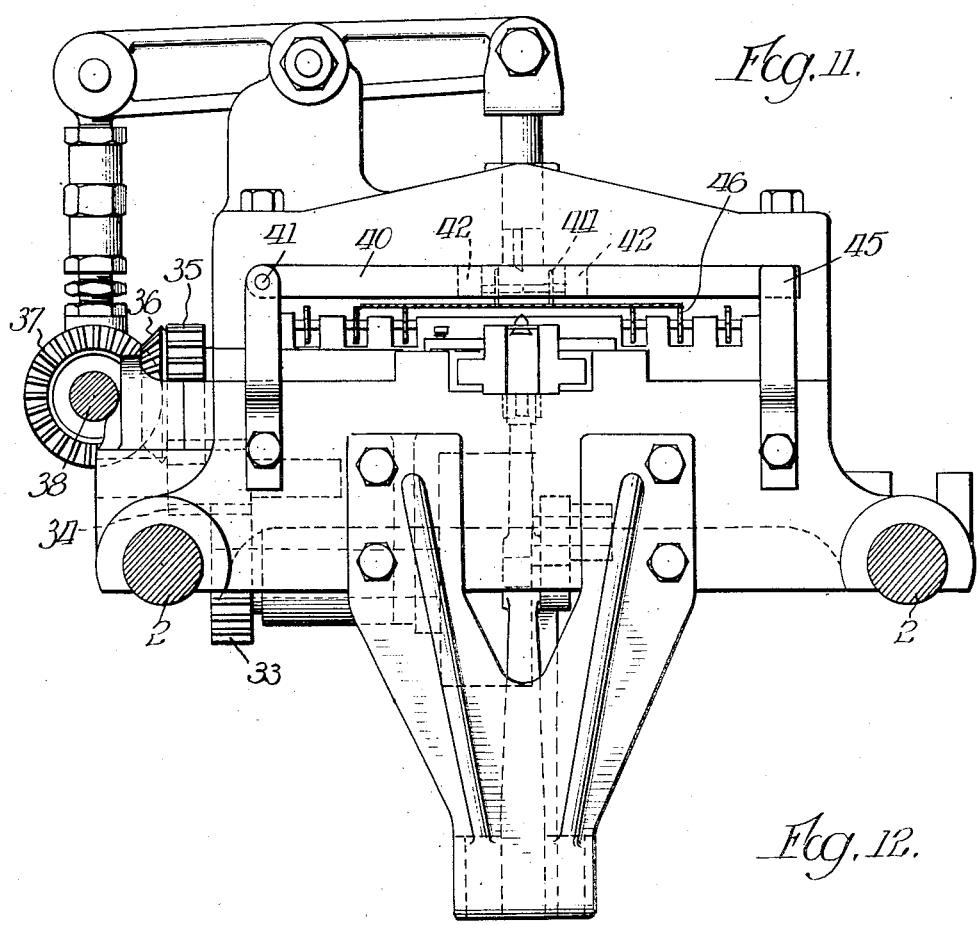

A. H. SWETT & W. D. LA BATT.
TAG MACHINE.
APPLICATION FILED NOV. 10, 1910.
1,037,367.
Patented Sept. 3, 1912.
9 SHEETS—SHEET 1.
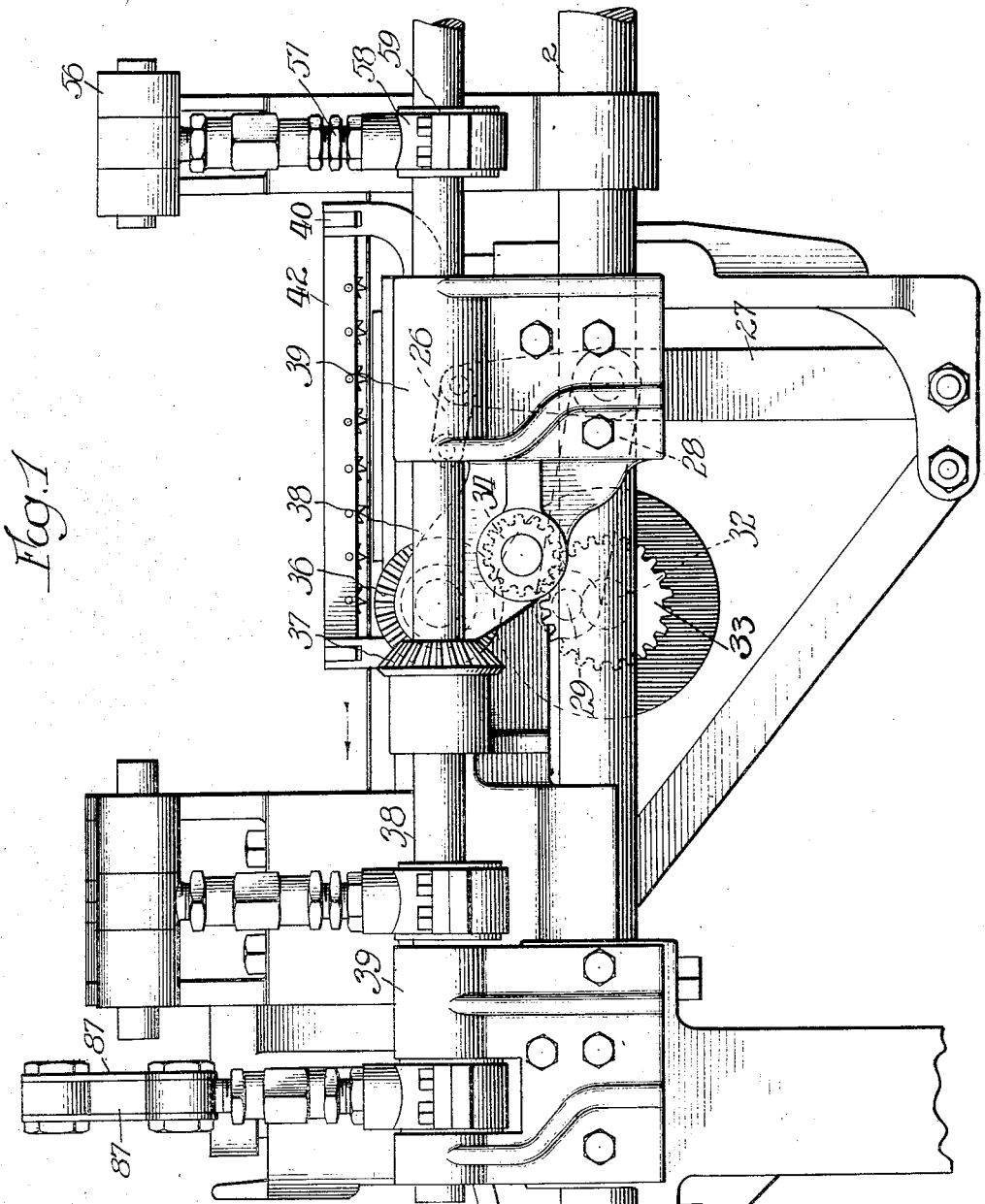

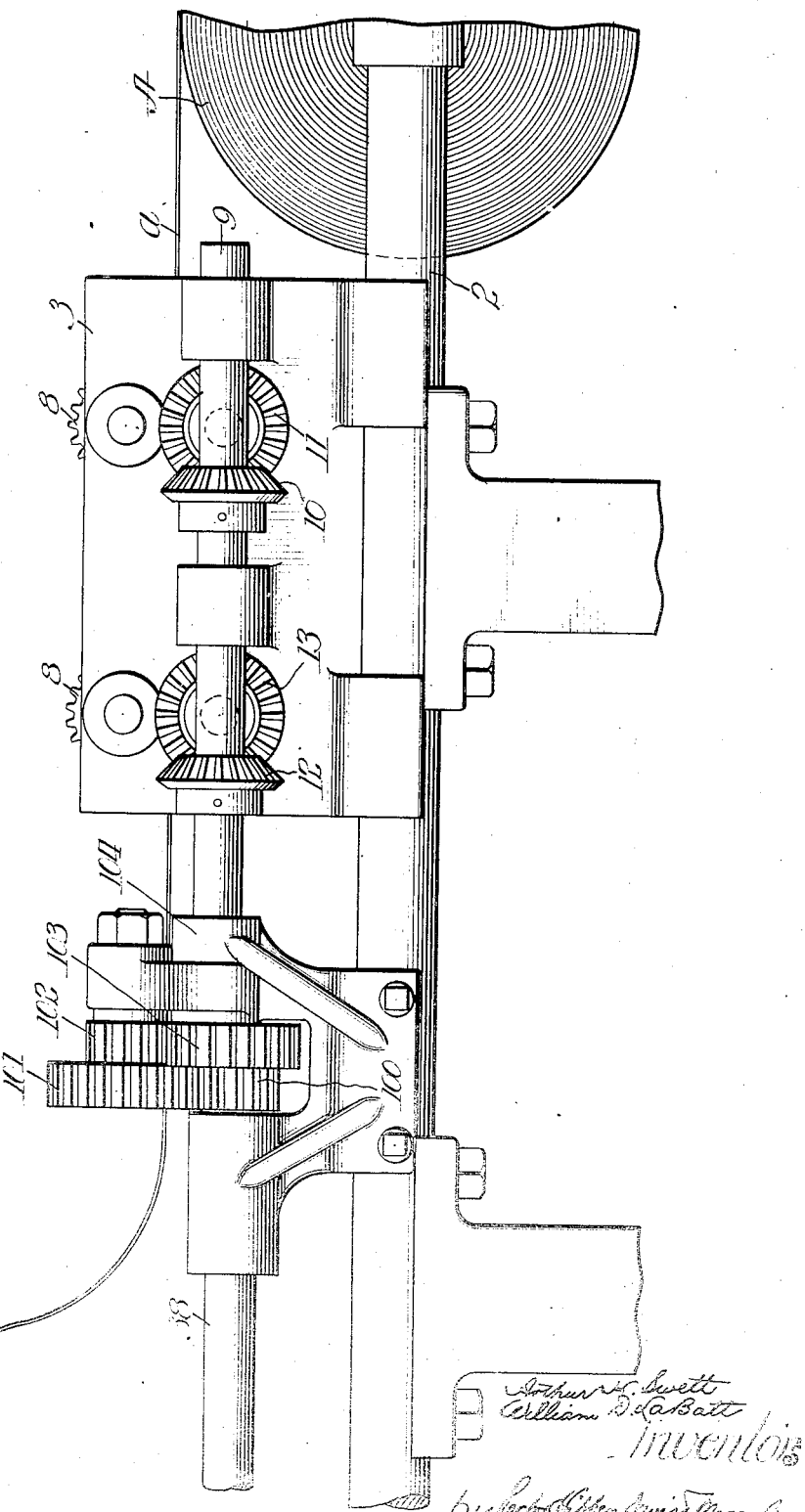

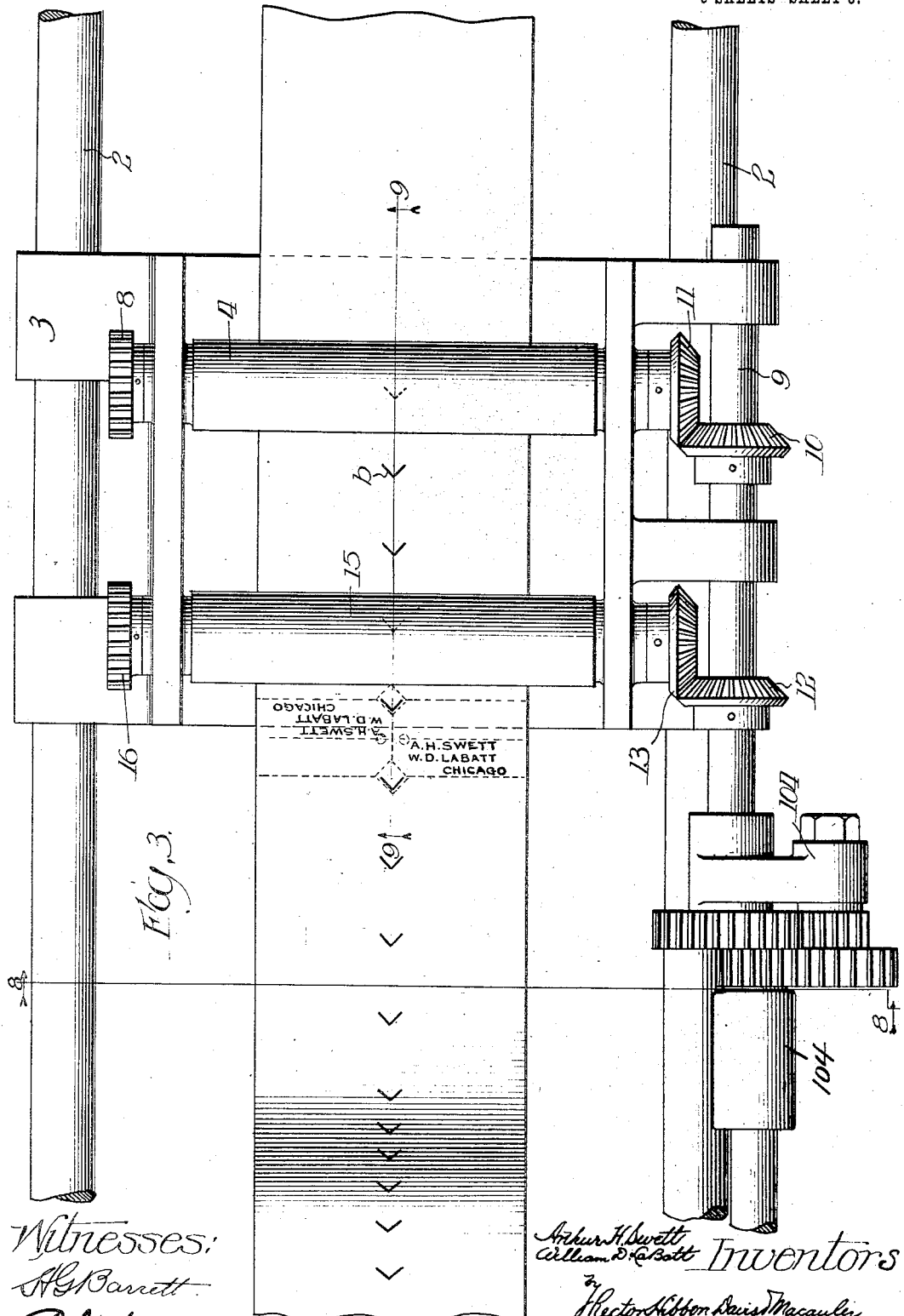

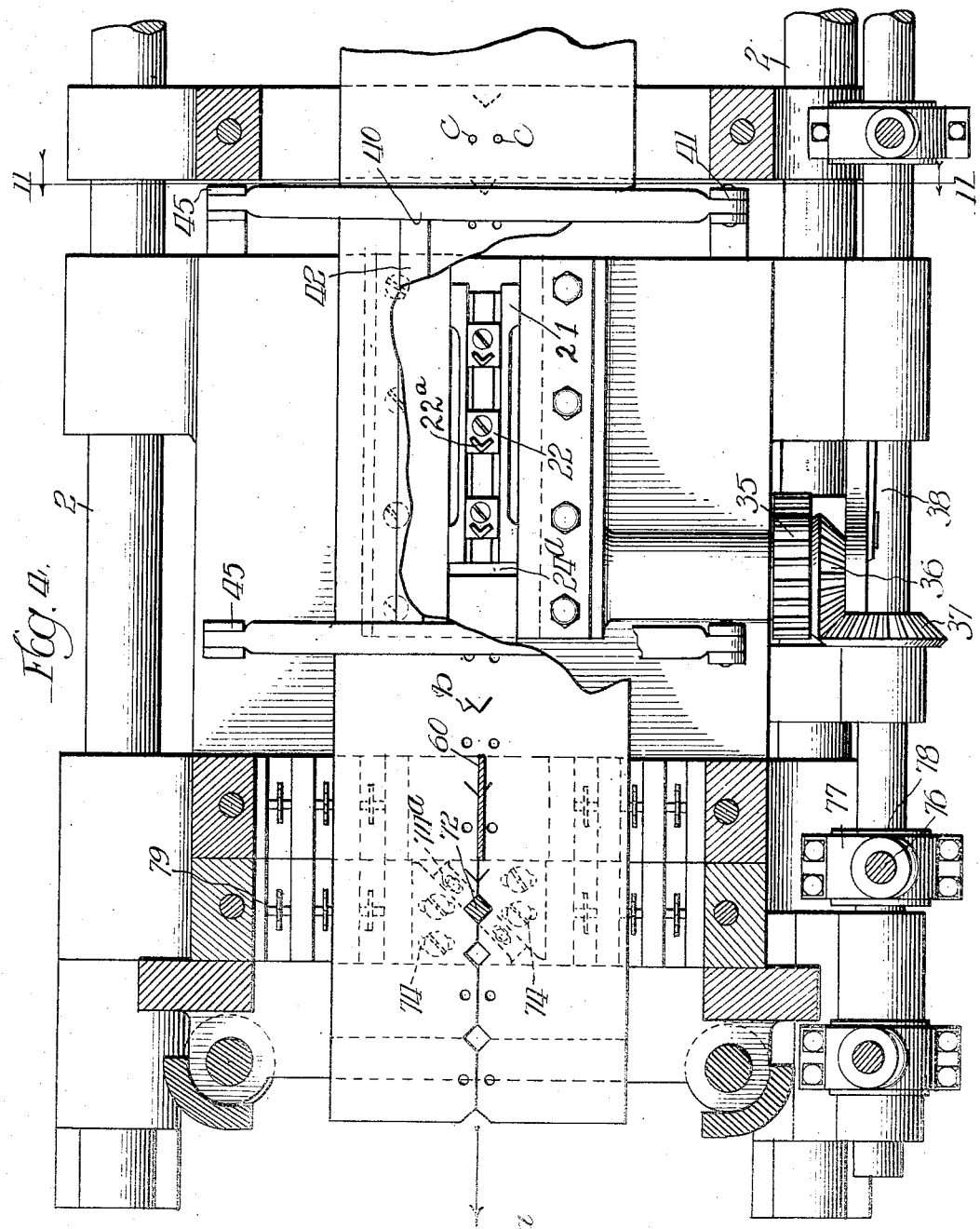

A. H. SWETT & W. D. LA BATT.
TAG MACHINE.
APPLICATION FILED NOV. 10, 1910.
1,037,367.
Patented Sept. 3, 1912.
9 SHEETS—SHEET 5.
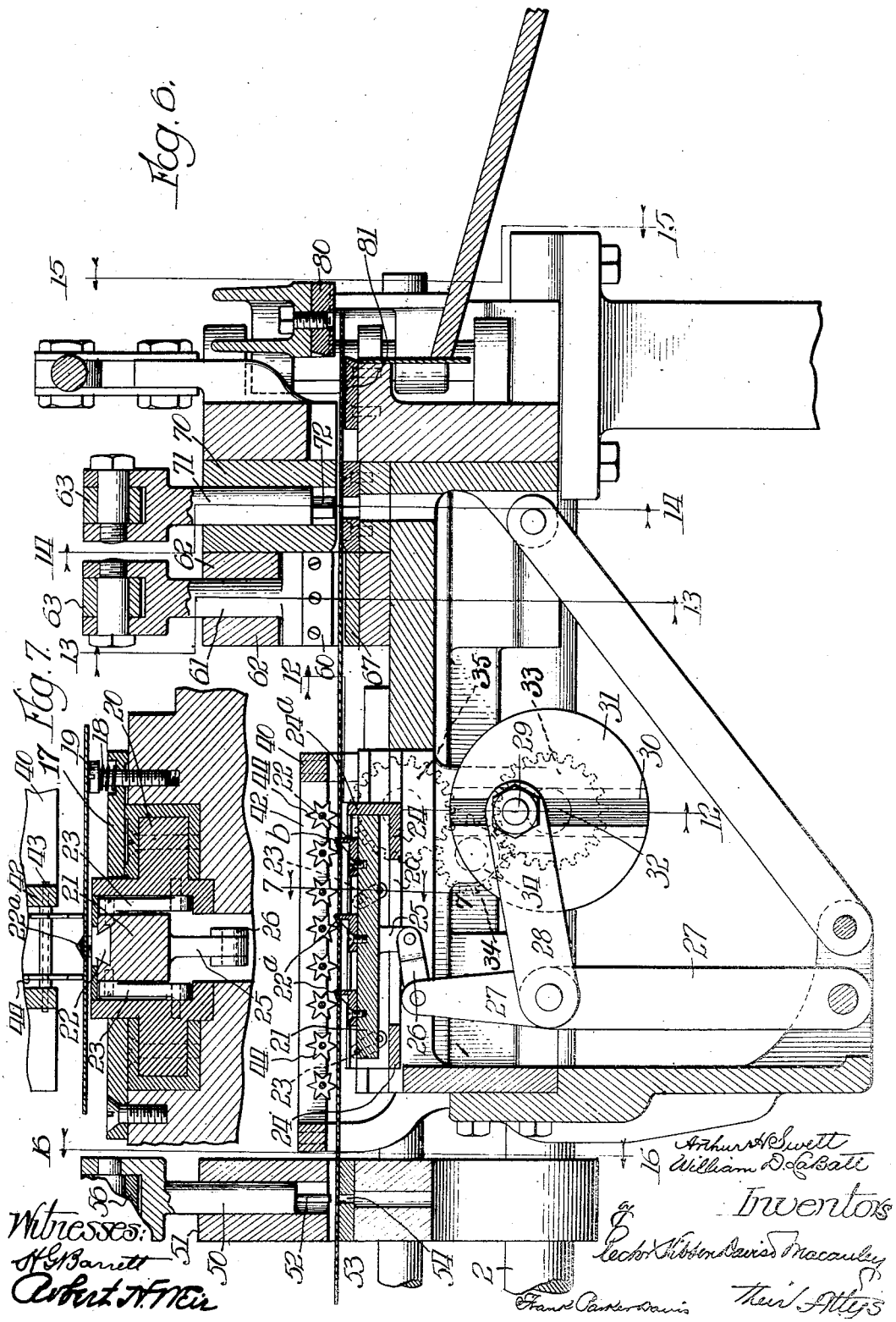

A. H. SWETT & W. D. LA BATT.
TAG MACHINE.
APPLICATION FILED NOV. 10, 1910.
1,037,367.
Patented Sept. 3, 1912.
9 SHEETS—SHEET 6.
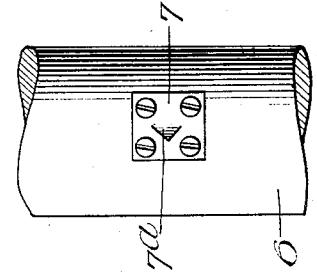
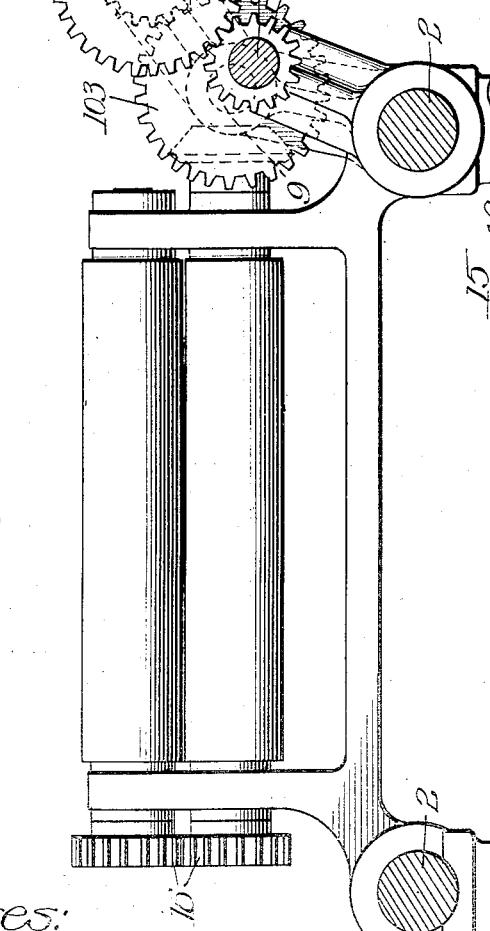
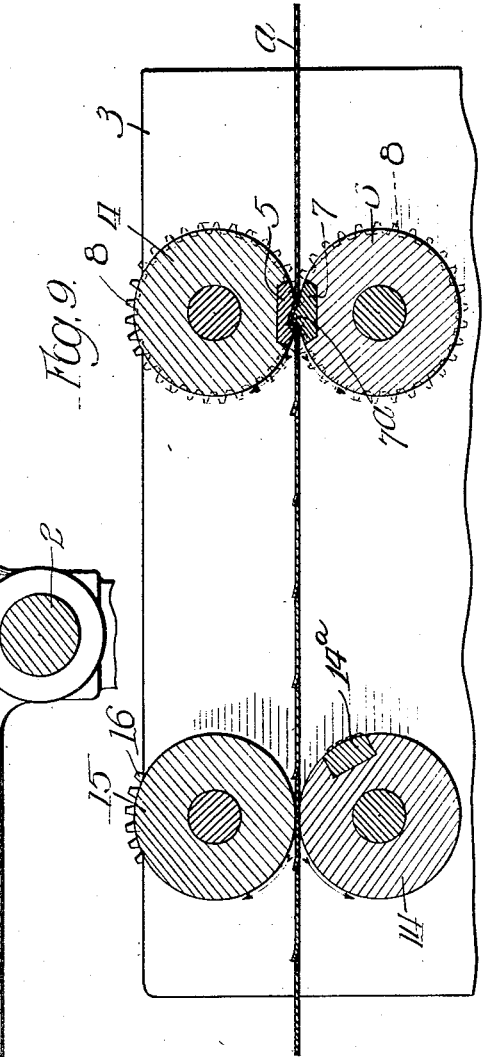

A. H. SWETT & W. D. LA BATT.
TAG MACHINE.
APPLICATION FILED NOV. 10, 1910.

1,037,367.

Patented Sept. 3, 1912.
9 SHEETS—SHEET 7.

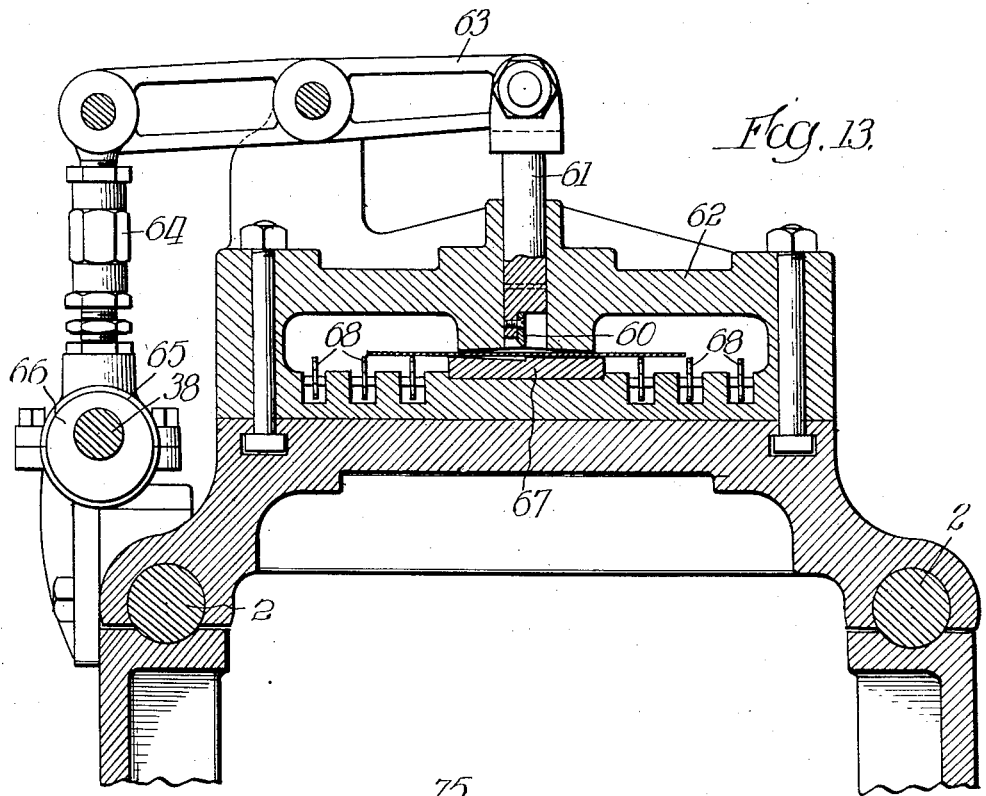
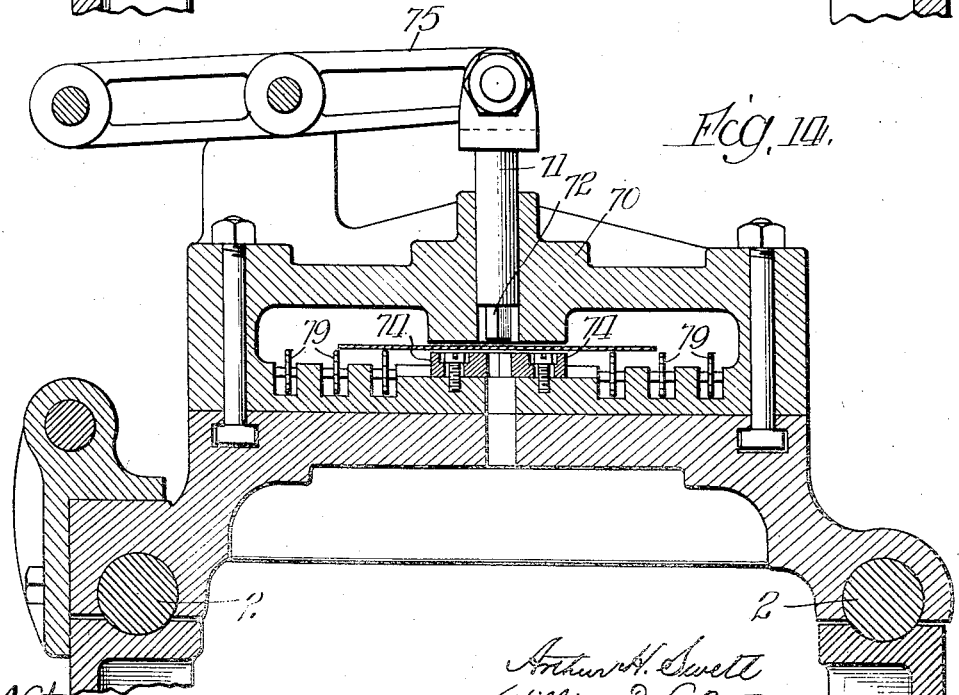

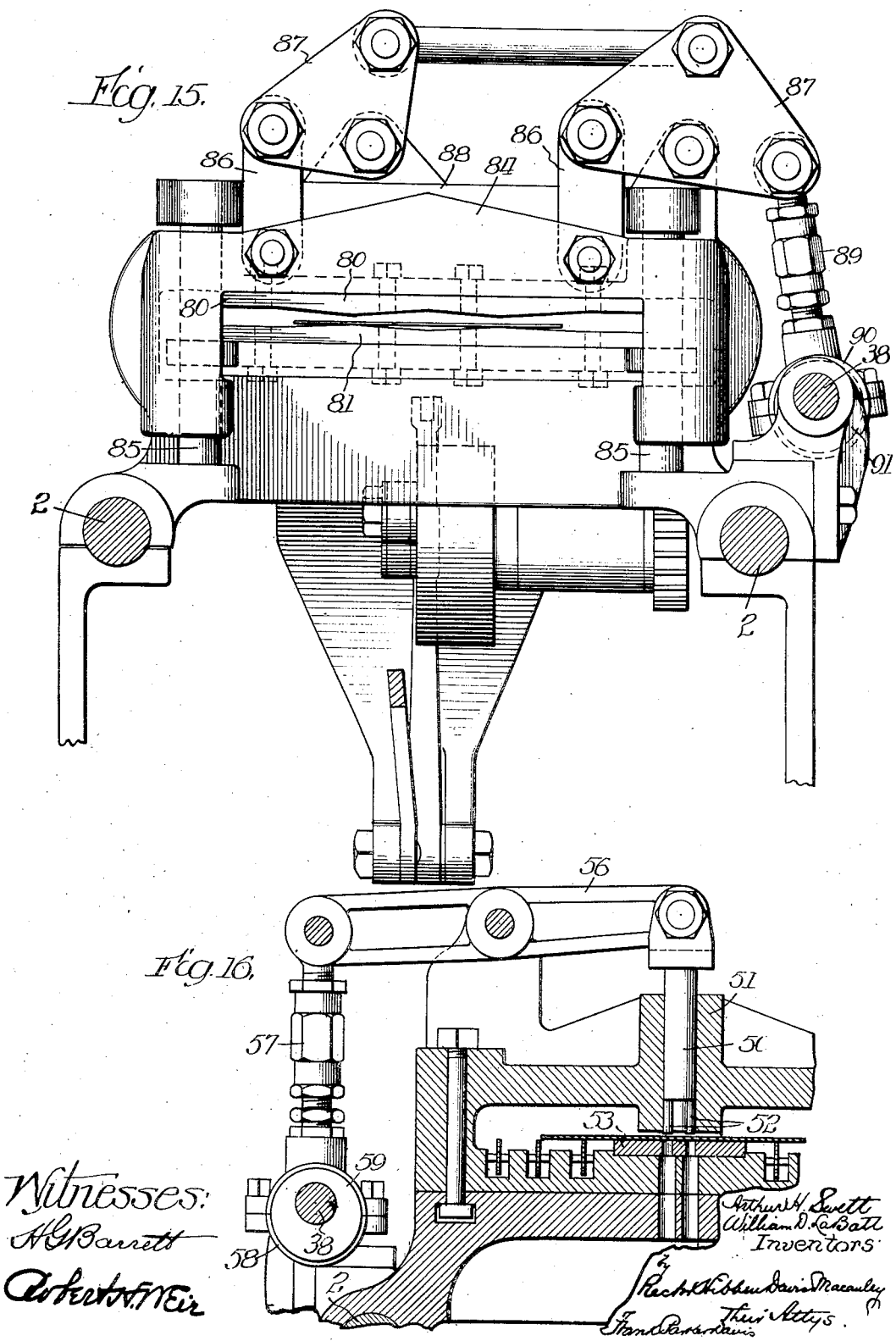

UNITED STATES PATENT OFFICE.

ARTHUR H. SWETT AND WILLIAM D. LA BATT, OF CHICAGO, ILLINOIS, ASSIGNORS TO AMERICAN TAG COMPANY, OF CHICAGO, ILLINOIS, A CORPORATION OF ILLINOIS.

TAG-MACHINE.

1,037,367.  Specification of Letters Patent.  Patented Sept. 3, 1912.

Application filed November 10, 1910. Serial No. 591,634.

*To all whom it may concern:*

Be it known that we, ARTHUR H. SWETT and WILLIAM D. LA BATT, citizens of the United States, residing at Chicago, Cook county, Illinois, have invented certain new and useful Improvements in Tag-Machines, of which the following is a specification.

Our invention relates to machines designed for performing various operations upon a continuous web of material, such for example as tag stock drawn from a roll, and the main object is to provide for turning out the finished product (for example printed tags) at a high speed, at the same time insuring that there shall be exact and uniform registration in the matter of the various operations performed upon the web. Of course the greater number of articles that can be turned out in a given time, the greater return for the investment in a machine, provided the article is kept up to standard. In the case of printing tags it is essential to satisfying the trade that the printed matter on the tag shall be uniformly and symmetrically located with reference to the outline of the tag and it is likewise essential that the form and dimensions of a specified tag shall not vary.

A general statement of the main features of the embodiment of our invention hereinafter specifically described may well serve at the outset to clearly indicate the nature of the invention.

The web, drawn from a roll, passes between continuously running rollers which form, longitudinally of the web, a series of incisions at regular intervals and print the web in exact registry with such incisions, the latter serving later on as means whereby the web may be intermittently advanced for presentation to punching, slotting, corner-cutting and cutting-off dies and knives. It will be understood of course that a loop is maintained in the web between the point where the same is fed intermittently and the point where it is fed continuously. The invention is not necessarily limited to the performance of just such operations as above mentioned, or to any particular operations, the main point being that the web is preliminarily prepared at the initial point of feed for engagement subsequently with intermittent feeding devices, so that surface characterizations, *e. g.*, printing, produced in association with the said preparatory treatment of the web, will eventually be in exact registry with other effects produced upon the web in association with the intermittent feed thereof, as for example punching, slitting and cutting.

Figure 12:
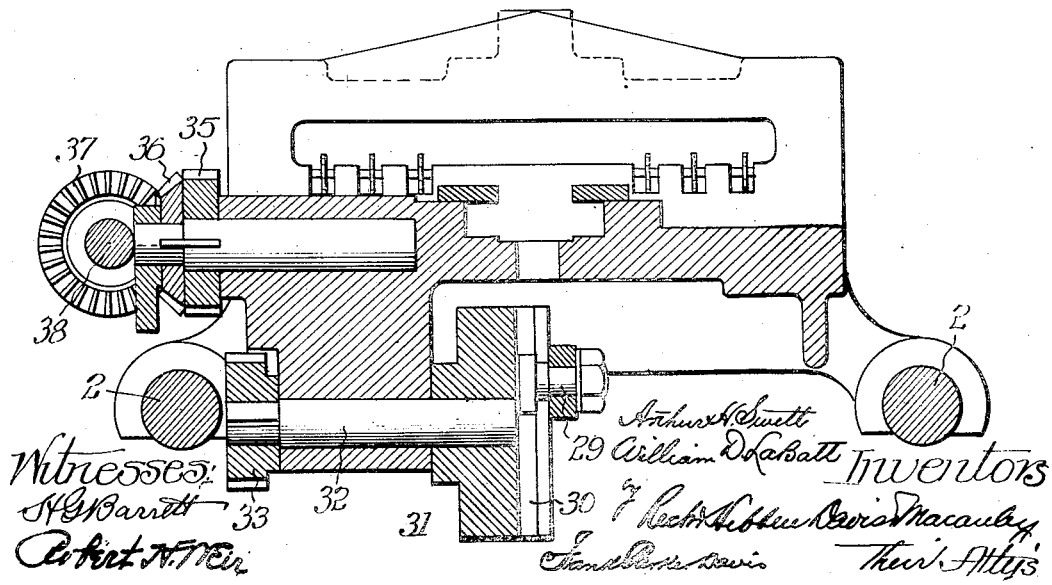

In the drawings which accompany and form part of this specification, the same illustrating such form of embodiment of the invention as above referred to, Figure 1 represents in side elevation that portion of the machine which includes the intermittent feeding devices and the punching and severing devices; Fig. 2 represents in similar elevation that portion of the machine including the initial feeding devices, which are rotary in character comprising a die couple and a printing couple; Fig. 3 represents in plan view that portion of the machine illustrated in Fig. 2 with the web passing through; Fig. 4 is a sectional plan view of that portion of the machine illustrated in Fig. 1 with the web passing through but broken away; Fig. 5 is a detail plan view of an adjustable female die; Fig. 6 is a central vertical section of that portion of the machine to which Figs. 1 and 4 relate; Fig. 7 is a cross-section taken substantially on the line 7—7 of Fig. 6; Fig. 8 is a cross-section taken on the line 8—8 of Fig. 3; Fig. 9 is a longitudinal section taken on the line 9—9 of Fig. 3; Fig. 10 is a detail of a portion of the male-die roller which appears in section in Fig. 9; Fig. 11 is a cross-section on line 11—11 of Fig. 4; Fig. 12 is a cross section taken substantially on the line 12—12 of Fig. 6; Fig. 13 is a cross-section taken substantially on the line 13—13 of Fig. 6; Fig. 14 is a section taken substantially on the line 14—14 of Fig. 6; Fig. 15 is an end elevation of the machine looking from the right of Fig. 6; and Fig. 16 is a cross-section on line 16—16 of Fig. 6.

Suitable provision is made at one end of the machine for supporting a roll of tag stock A which is of double width, or of width twice the length of the tag to be produced, see Fig. 4. On suitable side supporting rods 2 are mounted heads 3 having bearings for two sets of rollers between which the web $a$ passes and by which it is continuously advanced. One set of rollers (the first between which the web enters) constitutes a die couple, the upper roller 4 of this set having suitably mounted in it the female die-block 5 and the lower roller 6 having suitably mounted in it the male die-block 7, whose acting portion $7^a$ (Figs. 9 and 10) is V-shaped. It results that as the web is drawn between these rollers 4 and 6 there will be formed in the web along a central line thereof at regular intervals V-shaped incisions as illustrated in Fig. 3, the acting portion $7^a$ of the male-die cutting through the web and striking a portion of it up into the female die-block 5, as illustrated in Fig. 9.

The two rollers 4 and 6 are geared together by spur gears 8 of the same size and are driven from a shaft 9 by a bevel gear 10 thereon which meshes with a bevel gear 11 on the journal of the lower roller, 6, (see Figs. 2 and 3). On the same shaft 9 is another bevel gear 12 of the same size as the bevel gear 10, meshing with a bevel gear 13 of the same size as the bevel gear 11 and secured to the journal of the lower roller 14 of a printing couple, the upper or impression roller of which is designated 15 (see Fig. 9) and geared to the upper roller by spur gears 16 of the same size as spur gears 8. The web $a$, after passing between the rollers 4 and 6 and being formed with the series of V-incisions, enters between the rollers 14 and 15 which run in exact time with the rollers 4 and 6 and the web is printed by electrotypes $14^a$ carried by the roller 14, see dotted lines Fig. 9.

It will be seen that the mechanism thus far described provides for insuring the placing of the printed matter on the web in exact registry with formations of the web (the V-incisions), which formations are eventually to serve as a means for intermittently advancing the web.

Beyond the printing rollers, of which there may be several sets if desired, as when printing in different colors, a loop is maintained in the web as indicated in Figs. 2 and 3 and the web then passes to that part of the machine where various operations are performed upon it requiring an intermittent feed. As here shown, the web first passes between eyelet-hole punching dies and then to the intermittent feeding devices and after that to the slitting, corner-cutting and cutting-off or severing knives or dies, though the order may of course be varied and other operations may be performed upon the web under control of the intermittent feed, such for example as the so-called washer attaching.

The intermittent feeding mechanism is best shown in Figs. 6 and 7 (see also Figs. 1 and 4). A slide head or block 20 fits in suitable ways in the bed-plate of the machine and is open at the middle to receive a holder or bar 21 which carries in a dovetailed groove a set of pieces 22 having V-shaped tapering projections $22^a$ adapted to enter the V-incisions in the web as illustrated in Fig. 6 and advance the web by forward movement of the holder 21 and slide-head 20. The latter has merely a reciprocating motion back and forth but the holder 21 also rises and falls in order to enter its feeding projections $22^a$ into the incisions $b$ and withdraw them therefrom. To this end said holder is connected to the slide-head by a pair of radius links 23 on each side which permit the holder to swing upward and forward from a position where it rests upon cross bars 24 of the slide head to a position where its front end abuts against a vertical shoulder $24^a$ of the slide head as shown in Fig. 6. This movement is sufficient to carry the projection $22^a$ into the incisions of the web. Reciprocation is imparted to the slide head through the medium of the holder 21, so that the latter will first partake of its movement independent of the slide head and then move the latter along with it, suitable friction being supplied to prevent any movement of the slide head until the holder has had its full independent movement. As here shown friction is supplied by a confining plate 17 pressed upon the slide-head by springs 18 under heads of attaching bolts 19 (Fig. 7). To actuate the holder there is connected to a pendent ear 25 thereof a short link 26 coupled at its opposite end to a lever 27, the latter pivoted at its lower end to a bracket of the supporting frame-work. This lever 27 is coupled at an intermediate point to a pitman 28, which is suitably connected to a wrist pin 29 adjustable in the diametrical slot 30 of a crank disk 31. Said disk is secured to a shaft 32 (Fig. 12) which carries at the other end a gear-wheel 33 in mesh with a double width idler 34 (dotted lines Fig. 11) which meshes with a gear-wheel 35, the latter being fast with a bevel gear 36 in mesh with a bevel gear 37 secured to a shaft 38. This shaft is journaled in bearings provided by brackets 39 secured to the side rods 2 and is continuously driven from any suitable source of power. It will be obvious that through the gearing described said shaft will continuously rotate the crank disk 31 and the latter will, through the connections described, impart the up and down and lengthwise reciprocating motion to the holder 21. By reason of the V form of the projections $22^a$ on pieces 22 carried by said holder and the V-form of incisions in the web, the latter will be kept central by the seating of the said projections in the incisions. It was before stated that in the formation of these incisions, portions of the web would be struck up as illustrated in Fig. 9, but of course as the web passes on between the printing rollers 14 and 15 the struck up portion will be flattened out. When the feed projections 22ª rise these same portions of the web will obviously yield to permit the entrance of the said projections into the incisions. It will now be seen that, with the above described intermittent feeding mechanism, the advance of the web caused thereby will accord with the printed matter, since the formation in the web by which the intermittent feed is positively governed has accompanied the printing.

In order to keep the web from rising, so as to insure the proper entrance of the feed projections 22ª into the incisions, a hinged frame 40 is arranged to lie over the web throughout an area embracing the range of movement of the said projections and extending on both sides thereof. This frame is hinged at one side as shown at 41 and has parallel longitudinal bars 42, Fig. 7, between which extend journal rods 43 for a series of star wheels 44 adapted to bear upon the web adjacent the line of incisions thereof and on opposite sides of the same, said wheels being freely rotatable. These star wheels are pressed upon the web by the weight of the frame and the latter is held steady by frictional engagement of its side arms with jaws 45 formed at the upper ends of brackets on the framework.

As the machine is here shown organized, punching dies are adapted to operate upon the web at a point just in rear of the intermittent feed devices already described. Thus a male die 50 is arranged to slide vertically in a yoke 51 of the framework and has twin punches 52 (Fig. 16) to operate upon the web at opposite sides of a central longitudinal line thereof as indicated in Fig. 4, thus punching an eyelet hole for each of two tags to be formed end to end out of a transverse portion of the web, such holes being designated c in Fig. 4. The female die is designated 53 and is in the form of a plate secured to an under portion of the yoke 51, said plate having a pair of holes to receive the punches 52. A portion of the yoke extends close to the web to prevent the latter being pulled up when the punch withdraws. The die plunger 50 is jointed at its upper end to one arm of a lever or walking beam 56 the other arm of which is jointed to an eccentric rod 57 whose strap 58 surrounds an eccentric 59 secured to the drive shaft 38.

On the front side of the intermittent feed mechanism a knife 60 operates to slit the web lengthwise along the central line thereof between the feed incisions b. This knife is secured to the head of the plunger 61, Fig. 6, adapted to reciprocate in a yoke 62 and jointed at its upper arm to one end of a lever or walking beam 63, Fig. 13, the other arm of which is jointed to an eccentric rod 64 whose strap 65 embraces an eccentric 66 secured to the drive shaft 38. The knife 60 as shown in this figure of the drawings works past the shoulder of a die plate 67 set in an under portion of the yoke 62, and the upper portion of said yoke extends down close to the web for preventing the same from being pulled up when the knife rises. At this point the web runs over and is supported by star wheels 68 freely rotatable upon rods spanning channels in the under portion of the yoke 62 as illustrated in Fig. 13.

In a companion yoke 70 mounted just in front of the yoke 62 there is arranged to reciprocate a plunger 71, Fig. 14, having a male die 72 square in cross-section but set diagonally with reference to the web. The female die is composed of a pair of plates 74, Figs. 4 and 14, adjustable toward and from each other to provide for varying size of male dies, the said plates having confronting oblique edges to form a diagonal slot, and a pair of intervening plates 74ª adjustably mounted (Fig. 5) of which several sets of varying width will be provided to form with the plates 74 different sized square die openings. The plunger 71 is jointed at its upper end to one arm of a lever or walking beam 75, the other arm of which is jointed to an eccentric rod 76 whose strap 77 embraces an eccentric 78 secured to the driving shaft 38. The square die 72 is adapted to cut out a square portion from the web to form the diagonal corner portions of the tags and in this operation the V-incisions disappear. Preferably the die does not register with such incisions but cuts parallel therewith so as to insure smooth edges on the tags, whereas the edges produced by said incisions may become rough or irregular by reason of the action of the feed projections 22ª against them. The slitting knife 60 preferably cuts into but not entirely through the area to be embraced by the square die 72, the purpose being to hold the two longitudinal halves of the web together until said die 72 acts. A series of freely rotatable star wheels 79 are mounted in the under portion of the yoke 70, the same as the star wheels 68 are arranged in the yoke 62, for the purpose of supporting the web as it is operated upon by these dies and as it passes between the same, and the upper portion of said yoke 70 has a depending central part lying close to the upper side of the web to constitute a stripper plate.

When the web has advanced beyond the above described corner-cutting dies, it is ready to be severed for delivery of the completed tags. This is done by a cutting-off knife in the form of a die plate 80 preferably having a zigzag edge as illustrated in Fig. 15, which coöperates with the similar edge of a die-plate 81 secured on the bed plate of the machine, the two edges working past each other with a shearing effect. The die plate 80 is secured to a cross-head 84 mounted to slide up and down upon vertical side rods 85, Fig. 15. This cross-head is connected by a pair of links 86 with rocker plates 87 pivoted to a frame 88, and one of these rocker plates is jointed to an eccentric rod 89 whose strap 90 embraces an eccentric 91 secured on the drive shaft 88.

It will be obvious that the various reciprocating dies and knives operate in unison and it will of course be understood that they are timed with relation to the intermittent feed mechanism so as to operate upon the web when the latter is stationary between intermittent advances caused by the said mechanism. It will be further clear that with the intermittent advance of the web regulated in the manner described by a formation produced in association with the printing, the various operations on the web by such dies and knives will be in exact register with the printing, so that the tags when cut off will have the printed matter symmetrically and uniformly thereon in relation to the outline and the eyelet holes.

The shaft 9 which drives the die rollers 4 and 6 and the printing rollers 14 and 15 is driven from the shaft 38 but necessarily at reduced speed as compared therewith, inasmuch as said shaft 38 operates the reciprocating parts and the intermittent feed mechanism, whereas the shaft 9 is continuously rotating said rollers. Reducing gearing is therefore employed comprising a pinion 100 secured to the end of the shafts 38 (Fig. 8) and meshing with a gear wheel 101 having in the present instance four times as many teeth and being secured to a pinion 102 of the same size as the pinion 100, said pinion 102 meshing with a gear wheel 103 secured to the shaft 9 and being of the same size as the gear wheel 101. The latter and the pinion 102 are idlers rotating upon a stub shaft secured in a bracket 104 carried by the side supporting rod 2 and also affording a bearing for the shaft 38.

What is claimed is:

1. In a machine of the character described, the combination of rotary means for continuously advancing and surface-characterizing the web and further characterizing the web at regular intervals in registry with the surface characterizations for subsequent intermittent advance; means for so advancing the web; and means for further treating it between such intermittent advances.

2. In a machine of the character described, the combination of means for continuously advancing the web and characterizing it at regular intervals for subsequent engagement by intermittent means; means for intermittently advancing the web so characterized by positive engagement therewith; and means of a reciprocatory character for treating the web between intermittent advances thereof.

3. In a machine of the character described, the combination of rotary die and surface characterizing means for characterizing the surface of the web at intervals in registry with feed formations produced by the die means at intervals; means for intermittently advancing the web so treated by engagement with said feed formations; and means of a reciprocatory character for further treating the web between intermittent advances thereof.

4. In a machine of the character described, the combination of a rotary die-couple for producing feed formations; a rotary couple for surface-characterizing the web; gearing connecting the couples for synchronous continuous movement; means for intermittently advancing the web by engagement with the formations produced by the die-couple; and means of a reciprocatory character for treating the web between intermittent advances thereof.

5. In a machine of the character described the combination of rotary means for continuously advancing and surface-characterizing the web and forming incisions in the web at regular intervals in registry with the surface chacterizations, means for intermittently advancing the web by engagement with the incisions therein; and means for further treating the web between intermittent advances thereof.

6. In a machine of the character described the combination of rotary means for continuously advancing and surface-characterizing the web and forming V-incisions in the web at regular intervals in registry with the surface characterizations, means for intermittently advancing the web by engagement with the incisions therein; and means for further treating the web between intermittent advances thereof.

7. In a machine of the character described, the combination of a rotary die-couple comprising a V-cutting die and die-block; a rotary couple for surface-characterizing the web; gearing connecting the couples for synchronous continuous movement; means for intermittently advancing the web by engagement with the formations produced by the die-couple; and means of a reciprocatory character for treating the web between intermittent advances thereof.

8. In a machine of the character described the combination of rotary means for advancing and surface-characterizing the web and further characterizing the web at regular intervals in registry with the surface characterizations, for subsequent intermittent advance; means of a reciprocating character for so advancing the web; and means for further treating it between such intermittent advances.

9. In a machine of the character described the combination of rotary means for advancing and surface-characterizing the web and forming incisions in the web at regular intervals in registry with the surface-characterizations, means for intermittently advancing the web by engagement with the incisions therein, said means comprising a reciprocating member having one or more projections to enter the incisions; and means for futher treating the web between intermittent advances thereof.

10. In a machine of the character described the combination of rotary means for advancing and surface-characterizing the web and forming V-incisions in the web at regular intervals in registry with the surface-characterizations, means for intermittently advancing the web by engagement with the incisions therein, said means comprising a reciprocating member having one or more V-shaped projections to enter the incisions; and means for further treating the web between intermittent advances thereof.

11. In a machine of the character described the combination of means for advancing and surface-characterizing the web and forming incisions in the web at regular intervals in registry with the surface-characterizations, means for intermittently advancing the web by engagement with the incisions therein, said means comprising a member reciprocating lengthwise the web and a member reciprocating therewith and independently crosswise the web and having projections to enter the incisions in the latter; and means for further treating the web between intermittent advances thereof.

12. In a machine of the character described the combination of means for advancing and surface-characterizing the web and forming incisions in the web at regular intervals in registry with the surface-characterizations, means for intermittently advancing the web by engagement with the incisions therein, said means comprising a slide-head, a holder mounted thereon for limited movement independent and transverse thereof and having one or more projections to engage the incisions on the web, and reciprocating devices applied to the holder; and means for further treating the web between intermittent advances thereof.

13. In a machine of the character described the combination of means for advancing and surface-characterizing the web and forming incisions in the web at regular intervals in registry with the surface-characterizations, means for intermittently advancing the web by engagement with the incisions therein, said means comprising a slide-head, a holder mounted thereon through radius links for limited movement independent and transverse thereof and having one or more projections to engage the incisions on the web, and reciprocating devices applied to the holder; and means for further treating the web between intermittent advances thereof.

14. In a machine of the character described the combination of means for advancing and surface-characterizing the web and forming V-incisions in the web at regular intervals in registry with the surface characterizations, means for intermittently advancing the web by engagement with the incisions therein; and means for further treating the web between intermittent advances thereof, including a square cutting-out die adapted to remove a piece of the web embracing that portion between the incisions forming the V.

15. In a machine of the character described, the combination of means for advancing and surface-characterizing the web and forming along a central line thereof V-incisions at regular intervals in registry with the surface-characterizations; means for intermittently advancing the web by engagement with the V-incisions; a knife for cutting the web lengthwise between the latter; a die for removing square pieces of the web embracing the portions bound by the incisions forming the V's; and a knife for severing the web transversely and diagonally of the square cut-outs.

16. In a machine of the character described, the combination of a rotary die-couple comprising a V-cutting die and die block, a rotary couple for surface-characterizing the web, gearing connecting the couples for synchronous continuous movement, means for intermittently advancing the web by engagement with the formations produced by the die couple, and intermittently acting means for treating the web between intermittent advances.

17. In a machine of the character described, the combination of rotary means for continuously advancing and surface characterizing the web and further characterizing the web at regular intervals in registry with the surface characterizations for subsequent intermittent advances, intermittently acting means for so advancing the web, and intermittently acting means for further treating it between such intermittent advances.

18. In a machine of the character described, the combination of means for continuously advancing a web and forming engaging abutments at regular intervals thereof, reciprocating means intermittently engaging said abutments and advancing the web, and means for further treating the web between advances.

19. In a machine of the character described, rotary means for continuously receiving, feeding and perforating a strip at regular intervals, feeding means for engaging the perforations intermittently and intermittently acting means for treating the strip.

ARTHUR H. SWETT.
WILLIAM D. LA BATT.

Witnesses:
L. E. BEARDSLEY,
HENRY W. BIGELOW, Jr.